United States Patent [19]

Mark

[11] Patent Number: 5,036,928
[45] Date of Patent: Aug. 6, 1991

[54] DEVICE FOR DRILLING AN UNDERCUT IN A BOREHOLE

[75] Inventor: Fritz Mark, Mäder, Australia

[73] Assignee: Hilti Aktiengesellschaft, Schaan, Liechtenstein

[21] Appl. No.: 478,647

[22] Filed: Feb. 9, 1990

[30] Foreign Application Priority Data

Feb. 10, 1989 [DE] Fed. Rep. of Germany ....... 3903889

[51] Int. Cl.⁵ .............................................. E21B 7/28
[52] U.S. Cl. ..................................... 175/263; 408/150; 408/124; 408/127
[58] Field of Search ............... 400/150, 151, 127, 132, 400/124; 409/200, 74; 51/241, 241 A, 43; 279/6; 175/220, 202, 273, 263; 82/1.4

[56] References Cited

U.S. PATENT DOCUMENTS

| 1,316,718 | 9/1919 | Hall | 51/43 |
| 4,818,156 | 4/1989 | Bauer | 408/150 |
| 4,930,585 | 6/1990 | Noser et al. | 408/151 X |

FOREIGN PATENT DOCUMENTS 496631 12/1938 United Kingdom ................. 409/74

Primary Examiner—Larry I. Schwartz
Assistant Examiner—Robert Schultz
Attorney, Agent, or Firm—Toren, McGeady & Associates

[57] ABSTRACT

A device for drilling an undercut in a borehole in a receiving material comprises an axially extending guide sleeve with an eccentric bore and an eccentric bushing located in the eccentric bore and being rotatable therein relative to the sleeve. A tension spring is located between the sleeve and the bushing. During rotation of the bushing, relative to the sleeve, the torsion spring is stressed. A drive shaft with a cutter head at one end extends through the bushing and is brought into an eccentric position relative to the sleeve and at the same time commences an undercut in the borehole. A lock is provided with a set of teeth on the sleeve preventing rotation of the sleeve with the bushing. When the maximum eccentricity of the drive shaft is established, the lock can be released and the sleeve rotated along with the bushing by an eccentric transmission. During such rotation, a complete circumferentially extending undercut can be formed in the borehole. After completing the undercut, the torsion spring can rotate the sleeve relative to the bushing for returning the drive shaft to a centered position within the sleeve.

8 Claims, 2 Drawing Sheets

DEVICE FOR DRILLING AN UNDERCUT IN A BOREHOLE

BACKGROUND OF THE INVENTION

The present invention is directed to a device for drilling an undercut in a borehole in a receiving material, such as concrete, rock, masonry and the like. The device includes a housing arranged to abut against the receiving material. A guide sleeve with an eccentric bore parallel to the axis of the sleeve is located in the housing and an eccentric bushing is supported in the bore so that it can be rotated through an angle of approximately 180°. A drive shaft with a cutter head at one end extends through and is rotatably supported in the eccentric bushing.

Mainly, boreholes with undercuts are formed for receiving correspondingly shaped dowels for anchoring the dowels in a positively locked manner. The formation of a borehole with an undercut is, however, very expensive if known processes and devices are used.

A device for the formation of an undercut borehole is known from EP-A 0 231 720, however, the device is quite cumbersome to handle. In this device, an eccentric bushing is supported eccentrically in the guide sleeve and is turned by a worm drive. A drive shaft with a cutter head at its leading end is supported in the eccentric bushing and is moved into an eccentric position by the turning motion. As a result, the cutter head penetrates into the wall of the borehole. Subsequently, the guide sleeve along with the eccentric bushing and the rotatably supported drive shaft is turned through 360° forming a full circumferentially extending undercut in the wall of the borehole. Next, the eccentric bushing must be returned through 180° so that the cutter head is located in a centered position for removing the device from the borehole.

SUMMARY OF THE INVENTION

The primary object of the present invention is to provide a device for drilling an undercut in a borehole in a receiving material where the device is simple to handle and operate.

In accordance with the present invention, a torsion spring is located between the guide sleeve and the eccentric bushing and the spring is stressed when the eccentric bushing is rotated relative to the guide sleeve. Further, a releasable lock is located between the guide sleeve and the housing and secures the guide sleeve against rotation along with the eccentric bushing.

At the outset, in the formation of an undercut in the borehole, the eccentric bushing is rotated relative to the guide sleeve and the torsion spring is stressed. The releasable lock prevents the guide sleeve from rotating along with the bushing and assures a relative rotation between the bushing and the guide sleeve. After the undercut is initiated at one point, with the tension spring stressed to the maximum, the rotational lock acting on the guide sleeve, is released and the guide sleeve is rotated with the eccentric bushing through 360° forming a complete undercut around the circumference of the borehole. The torsion spring can only be released of its stress and returned to its neutral position when the entire undercut has been formed.

The rotational lock acting on the guide sleeve comprises a pawl cooperating with engagement cams on the sleeve. Such a pawl can be arranged to engage with the cams in different rotational positions. As a result, the guide sleeve can be locked from rotating in any desired rotational position.

In a preferred embodiment, the engagement cams are formed as saw teeth, since the rotational lock of the guide sleeve is required only in one rotational direction. The pawl can slide over the sawtooth-shaped engagement cams in the other rotational direction.

The rotational lock of the guide sleeve must be effective only until the cutter head has reached the required depth of the undercut in the surface of the borehole.

Accordingly, it is advantageous for the release of the rotational block, that the pawl is supported by an articulated toggle lever. Such a toggle lever has an unstable centered position with two stable positions located on the opposite sides of the centered position. The toggle lever can be moved from one stable position into the other by applying relatively little force. Advantageously, the eccentric bushing is connected with a drive shaft through a stepdown gear. The eccentric bushing is driven directly by the drive shaft through the stepdown gear or transmission. As a result, additional engagement means, such as cranks, hand wheels or the like, can be eliminated.

Such a stepdown gear affords a very compact construction. By rigidly coupling the eccentric bushing with the drive shaft, a specific stepdown ratio is always observed whereby the rpm of the eccentric bushing is always in a fixed ratio with respect to the rpm of the drive shaft, assuring optimum cutting or drilling values.

Preferably, the stepdown gear or transmission is an eccentric transmission providing a very compact construction and large transmission gear ratios.

A crosspiece, that is the part of the eccentric gear train rotating the fastest, is advantageously connected with the drive shaft. A block made up gear wheels is supported to be freely rotatable upon the crosspiece of the eccentric gear train. One gear wheel meshes with a stationary ring gear and the other gear wheel meshes with a rotatably supported ring gear. The rotatably supported ring gear is connected to the eccentric bushing. Depending upon the number of teeth selected, the rpm ratio of the crosspiece with respect to the rotatably supported ring gear can amount to approximately 600 to 1.

The transmission or stepdown gear train comprises in a preferred embodiment, a transmission housing which is connected with the device housing through a guide cross so that it is not rotatable relative to the housing and so that it can be displaced in a plane extending perpendicularly of the drive shaft. The guide cross prevents entrainment or following rotation of the transmission housing and, at the same time, makes possible a circularly-shaped motion of the transmission housing with respect to the device housing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
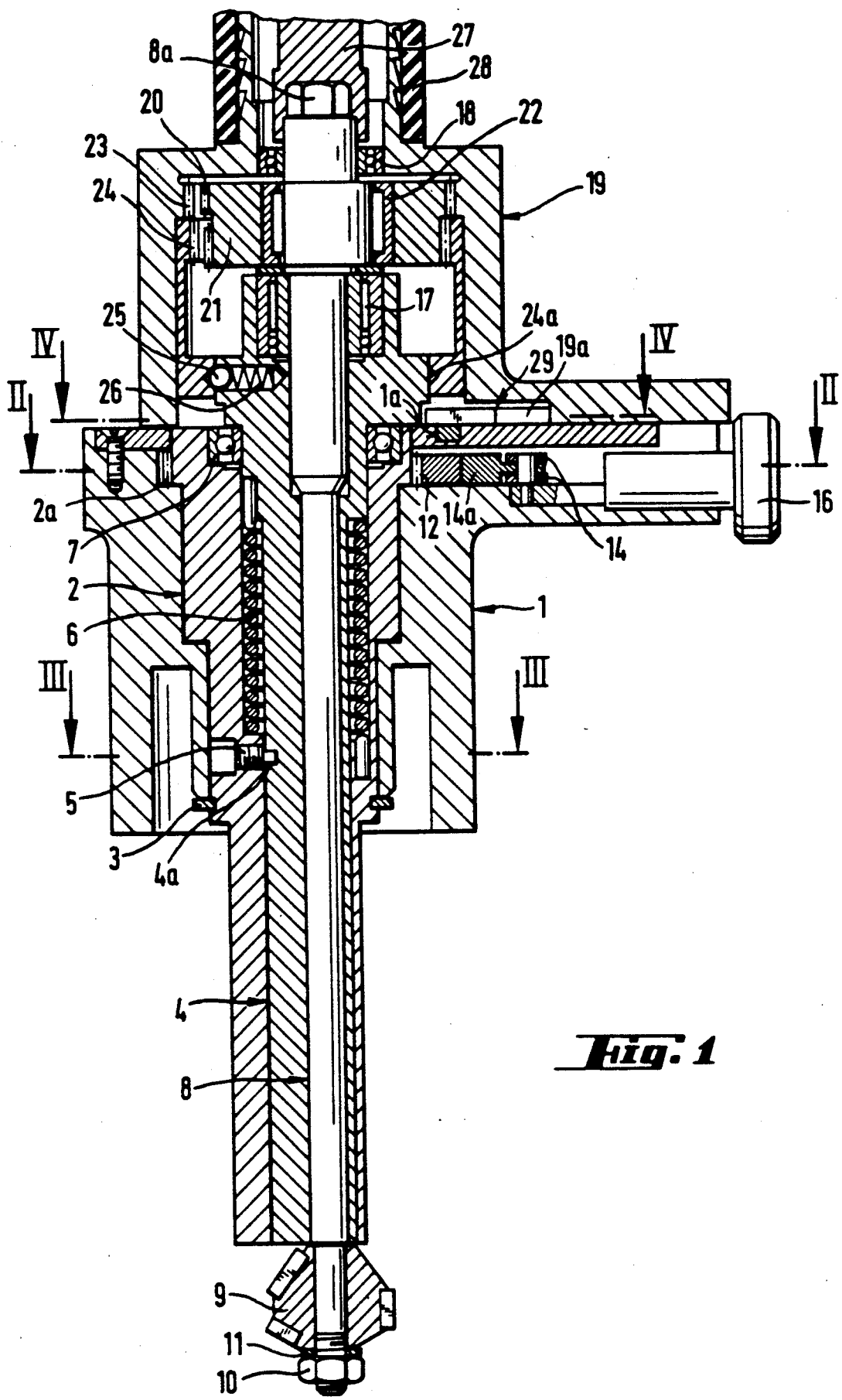
FIG. 1 is an axially extending cross-sectional view of a device embodying the present invention.

A device for drilling an undercut in a borehole embodying the present invention comprises an axially extending having an axially extending opening therethrough with a guide sleeve 2 located and rotatably supported in the opening. Guide sleeve 2 is secured in the housing 1 by means of a lock ring 3 adjacent one end of the housing and by engagement with a shoulder at the opposite end of the housing. An eccentric bushing 4 is rotatably supported in an axially extending eccentrically arranged bore in the guide sleeve 2. The extent to which the eccentric bushing 4 can be rotated relative to the guide sleeve 2 is limited by an annular groove 4a, extending for a portion of the bushing circumference and a threaded pin 5 is screwed into the guide sleeve and extends into the annular groove, note FIG. 3. A torsion spring 6 is positioned between the guide sleeve 2 and the eccentric bushing 4 and is in contact with both of them. Torsion spring 6 is stressed by a rotation of the eccentric bushing 4 relative to the guide sleeve 2. Eccentric bushing 4 is supported in the guide sleeve 2 by a ball bearing 7. A drive shaft 8 is rotatably supported within and extends through an eccentric bore in the eccentric bushing 4. At its leading end, the drive shaft 8 projects axially outwardly from the guide sleeve 2 and the eccentric bushing 4, and a cutter head 9 is secured on the leading end. In the arrangement as shown in FIG. 1, the eccentricities of the guide sleeve 2 and the eccentric bushing 4 are added together, whereby the cutter head 9 projects laterally outwardly beyond the outside surface of the guide sleeve 2. In this position an undercut can be formed in a known manner in a borehole in a receiving material. If the eccentric bushing is rotated through 180° relative to the guide sleeve, then the eccentricities cancel one another out. In this rotatably displaced position, the cutter head adopts a centered position with respect to the guide sleeve 2, so that the drilling device in this position can be inserted into the borehole or removed from it.

Figure 2:
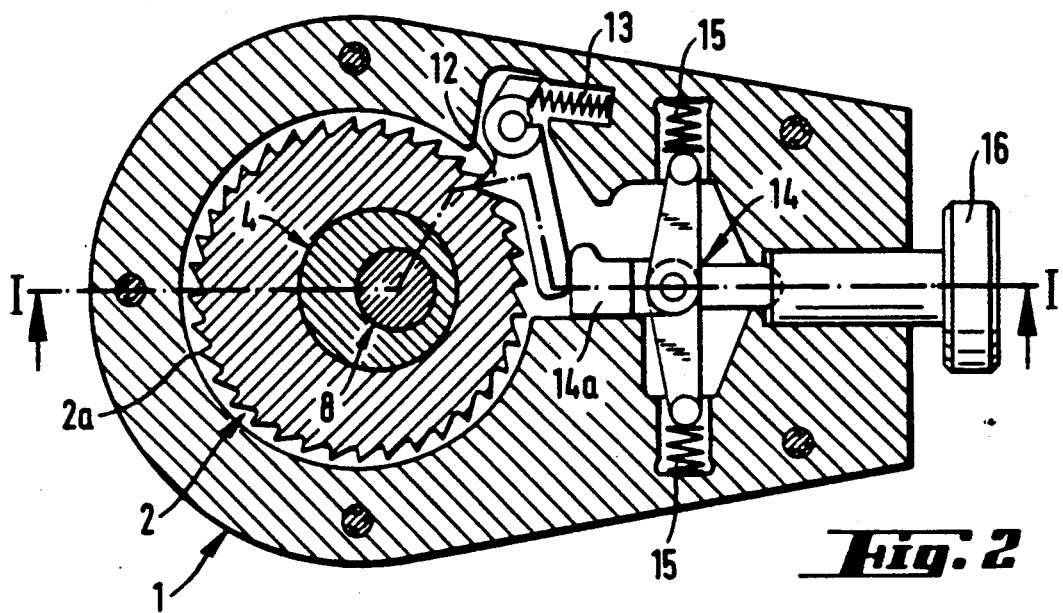
FIG. 2 is a cross-section through the device taken along the line II—II in FIG. 1.

Cutter head 9 is secured on the leading end of the shaft 8 by a nut 10 and a washer 11. As illustrated in FIG. 2, guide sleeve 2 is provided with a set of teeth 2a adjacent its trailing end extending around its outside periphery. A pivotally supported pawl 12 is shown in engagement with the teeth. Pawl 12 has a pair of arms, each extending outwardly on opposite sides of the pivot point. One arm of the pawl 12 is supported by a spring 13, while the other arm abuts against an articulated toggle lever 14 by an intermediate piece 14a. Spaced from its contact with the pawl 12, the toggle lever 14 has a pair of oppositely extending arms with the free end of each arm contacted by a compression spring 15. As displayed in FIG. 2, the articulated toggle lever 14 presses the pawl 12 into engagement with the set of teeth 2a. If the pressure of the set of teeth 2a becomes too great, however, the articulated toggle lever 14 snaps through its centered position and displaces a button 16 outwardly from the housing 1. In this position, the guide sleeve 2 is no longer locked against rotation and can rotate together with the eccentric bushing. The combined rotation of the guide sleeve 2 and the eccentric bushing 4 is necessary in forming an undercut.

Drive shaft 8 is supported in the eccentric bushing by a combined needle roller-ball bearing 17. In addition, the drive shaft is supported by a ball-bearing 18 in a transmission housing 19. A block made up of two gear wheels 20, 21 is rotatably supported by a needle roller bearing 22 on an eccentric portion of the drive shaft 8. Note the eccentric portion of the drive shaft 8 located in the transmission housing 19. Gear wheel 20 meshes with a ring gear 23 at the inner side of the transmission housing 19. Gear wheel 21 meshes with a ring gear 24 which is rotatably supported in the transmission housing 19 and is connected with the eccentric bushing through an overload clutch, including a ball 25, a spring 26, and snap-in apertures 24a. The gear wheels 20, 21, along with the ring gears 23, 24 form a so-called eccentric gear train or transmission. This eccentric gear train has a very high step-down ratio with small differences in the diameters of the individual gear wheels. In the illustrated embodiment, the step-down ratio is about 600 to 1. At its trailing end, drive shaft 8 has a hexagonally-shaped projection 8a. A flexible shaft 27 is connected with the projection 8a and serves for transmitting rotation from the flexible shaft to the drive shaft. Flexible shaft 27 is laterally enclosed by a jacket tube 28 secured onto the transmission housing 19.

Figure 4:
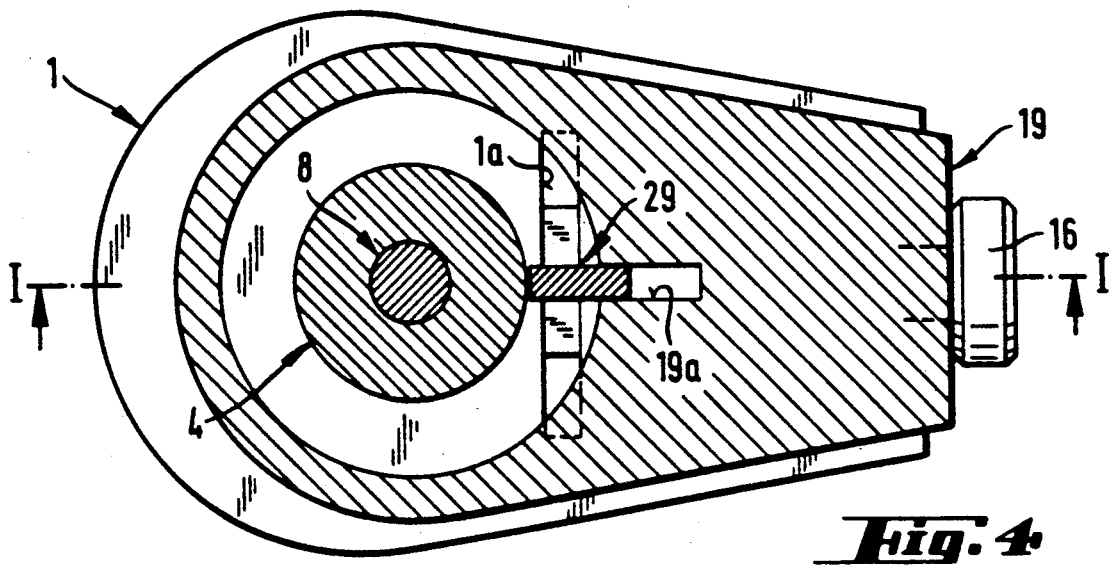
FIG. 4 is a cross-sectional view through the device taken along the line IV—IV in FIG. 1.

A guide cross 29 is located between the housing 1 and the transmission housing 19. The operation of the guide cross 29 can be noted with particular clarity from FIG. 4. An upper part of the guide cross 29 is guided in a groove 19a extending in the long direction of the transmission housing 19. The lower portion of the guide cross 29 is guided in a groove extending at an angle of 90° with respect to groove 19a in the housing. Accordingly, transmission housing 19 can be displaced with respect to the housing both in long and lateral directions, however, it cannot rotate.

Figure 3:
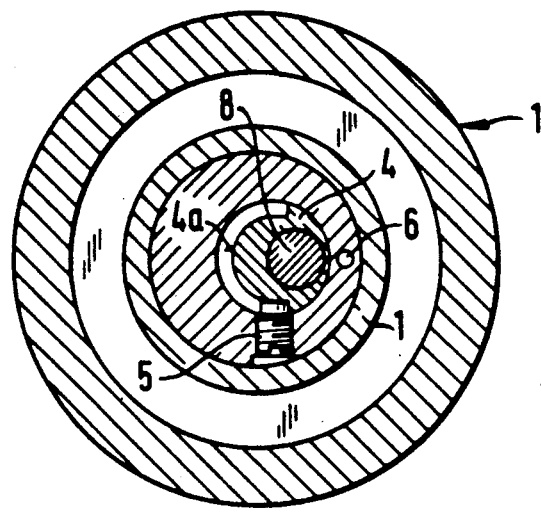
FIG. 3 is a cross-sectional view of the device taken along the line III—III in FIG. 1.

The device for drilling undercuts functions in the following manner:

At the outset, the button 16 is pushed inwardly and the pawl 12 is moved by the articulated toggle lever 14 into engagement with the set of teeth 2a. As a result, guide sleeve 2 is locked against rotation. In this condition, if the eccentric bushing 4 is driven by the eccentric transmission, the eccentric bushing 4 is rotated relative to the guide sleeve 2. This movement is shown in FIG. 3. With the threaded pin in contact with the end of the groove 4a, the eccentric bushing tends to rotate the guide sleeve along with it. To effect such rotation of the bushing in the sleeve, the pawl must be disengaged from the set of teeth, as described above. In the rotation of the eccentric bushing relative to the guide sleeve, the torsion spring 6 is stressed or tensioned. Initially, the cutter moves from the center position toward the full eccentric position and commences the cut into the receiving material to establish the undercut. By releasing the pawl 12, the lock preventing rotation of the guide sleeve is released and the guide sleeve 2 and the eccentric bushing are rotated together. During this rotation, an undercut is formed around 360° within the borehole. After the undercut has been completed, the resistance drops and the torsion spring 6 can rotate the guide sleeve 2 relative to the eccentric bushing 4. In such relative rotation, the cutter head 9 on the shaft 8 is returned to the centered position relative to the guide sleeve 2.

While specific embodiments of the invention have been shown and described in detail to illustrate the application of the inventive principles, it will be understood that the invention may be embodied otherwise without departing from such principles.

I claim:

1. A device for drilling an undercut in a borehole in a receiving material comprising an axially extending housing arranged to abut against the receiving material, an axially extending guide sleeve extending axially through said housing, said sleeve having an eccentrically arranged bore extending axially therethrough parallel to the sleeve and housing axes, an axially extending eccentric bushing located within said eccentric bore, said bushing being rotatable relative to said sleeve through an angle of approximately 180°, a drive shaft having a cutter head thereon rotatably and eccentrically supported in the said bushing, wherein the improvement comprises a torsion spring arranged between said sleeve and bushing and arranged to be stressed during rotation of said bushing relative to said sleeve, and means for releasably preventing rotation of said sleeve relative to said housing.

2. A device, as set forth in claim 1, wherein said means for preventing rotation comprises a pawl displaceably mounted in said housing and engageable with engagement cams on said guide sleeve.

3. A device, as set forth in claim 2, wherein said engagement cams are shaped in a sawtooth manner.

4. A device, as set forth in claim 2, wherein said pawl is displaceably supported by an articulated toggle lever.

5. A device, as set forth in 4, wherein said eccentric bushing is connected with said drive shaft by a step down gear train.

6. A device, as set forth in claim 5, wherein said step-down gear train comprises an eccentric gear train.

7. A device, as set forth in claim 6, wherein a ring gear of said eccentric gear train is connected with said eccentric bushing through an overload clutch.

8. A device, as set forth in claim 5, wherein said step-down gear train comprises a gear train housing connected with said axially extending housing by a guide cross so that said gear train housing is not rotatable relative to said axially extending housing and is displaceable in a plane extending perpendicularly to said drive shaft.

* * * * *